United States Patent [19]

Radzwill

[11] 4,177,099

[45] Dec. 4, 1979

[54] METHOD OF BONDING POLYURETHANE SHEETING TO ACRYLIC OR POLYURETHANE SHEETING IN PRODUCTION OF TRANSPARENT WINDOWS

[75] Inventor: John Radzwill, Arnold, Pa.

[73] Assignee: PPG Industries, Inc., Pittsburgh, Pa.

[21] Appl. No.: 609,331

[22] Filed: Sep. 2, 1975

[51] Int. Cl.² .................................................. B32B 17/00
[52] U.S. Cl. ........................................ 156/99; 156/106; 156/309; 156/308; 156/315; 156/331; 427/407 C; 428/424; 428/425; 428/918
[58] Field of Search .............. 156/308, 310, 331, 315, 156/307, 309, 99, 106; 427/385, 421, 407, 377; 428/424, 425, 522, 918; 260/33.8 UB, 32.6 UR, 77.5 AM, 77.5 AN, 77.5 AT, 75 NP, 75 NA

[56] References Cited

U.S. PATENT DOCUMENTS

| | | | |
|---|---|---|---|
| 2,929,800 | 3/1960 | Hill | 260/77.5 AM |
| 2,953,489 | 9/1960 | Young | 428/425 |
| 3,058,955 | 10/1962 | Neumann et al. | 260/33.8 UB |
| 3,315,380 | 4/1967 | Mack et al. | 156/310 |
| 3,388,035 | 6/1968 | Mattimoe et al. | 428/447 |
| 3,416,948 | 12/1968 | Maurer | 428/425 |
| 3,538,055 | 11/1970 | Camilleri et al. | 428/424 |
| 3,620,905 | 11/1971 | Ahramjian | 260/75 NP |
| 3,657,057 | 4/1972 | Shorr et al. | 156/308 |
| 3,658,939 | 4/1972 | Carpenter et al. | 260/77.5 AM |
| 3,703,425 | 11/1972 | Delmonte et al. | 156/99 |
| 3,718,518 | 2/1973 | Bock et al. | 156/331 |
| 3,755,262 | 8/1973 | Slagel | 260/77.5 AM |
| 3,823,060 | 7/1974 | McClung et al. | 428/424 |
| 3,931,113 | 1/1976 | Seeger et al. | 260/75 NT |

Primary Examiner—John T. Goolkasian
Assistant Examiner—J. J. Gallagher
Attorney, Agent, or Firm—Edward I. Mates

[57] ABSTRACT

This invention relates to a method of making transparent laminated windows with a minimum of opacity problems that may result from adhering preformed polyurethane sheeting to acrylic or polyurethane sheeting that constitute components of said transparent windows. The preferred embodiment of the invention comprises applying a dilute solution of up to 5 percent by weight, preferably 1 to 4 percent and most preferably about 2 percent, of finely divided particles of a polyurethane in an organic solvent in which it is highly soluble. A preferred solvent is chloroform. A preferred polyurethane composition is a polyesterurethane that is the reaction product of (a) a polyester having the ester linkage

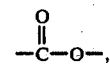

and a pair of groups reactive with isocyanate or isothiocyanate groups; (b) a diisocyanate, disisothiocyanate or a compound containing an isocyanate and an isothiocyanate group; and (c) a compound containing at least two active hydrogens per molecule reactive with isocyanate or isothiocyanate groups.

6 Claims, 1 Drawing Figure

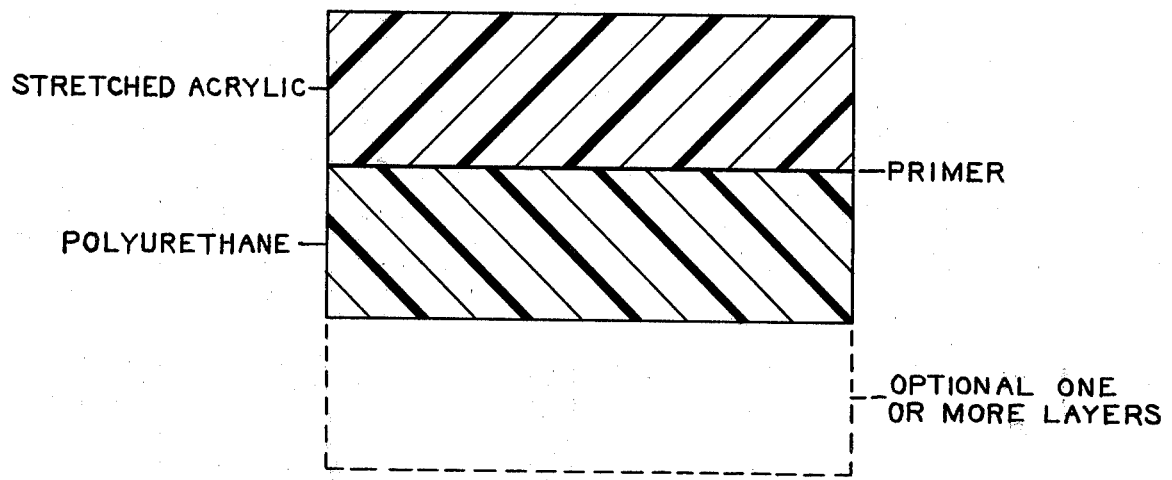

METHOD OF BONDING POLYURETHANE SHEETING TO ACRYLIC OR POLYURETHANE SHEETING IN PRODUCTION OF TRANSPARENT WINDOWS

BACKGROUND OF THE INVENTION

1. Field of the Invention

The present invention relates to a method of making transparent laminated windows with a minimum of opacity problems that may result from adhering polyurethane interlayer sheeting to acrylic plastic or another sheet of polyurethane that constitute components of said transparent windows, and a primer composition useful in said method. The present invention is especially concerned with a method of adhering a polymerized preformed sheet of polyurethane that is solid in appearance and difficult to adhere to acrylic plastic or another sheet of polyurethane to a rigid sheet of acrylic plastic or polyurethane during the fabrication of a transparent laminated window.

Laminated windows for aircraft contain alternate layers of rigid transparent material, which may be glass or any well recognized plastic substitute for glass such as polycarbonate compositions, acrylic compositions, (either stretched acrylic or as cast acrylic resins), or polyester resins, alternating with layers of flexible material, such as polyvinyl butyral or polyurethane. When the relatively rigid material is acrylic resin and the relatively flexible material is polyurethane, considerable difficulty is encountered in obtaining a suitable bond to adhere the layers to one another. This is especially so when the polyurethane is a preformed sheet of a polyester type of polyurethane.

Details of polyurethane compositions of the polyester type that have superior properties that make them most suitable for use in windows for aircraft and their method of manufacture for use in aircraft window fabrication may be obtained by reference to South African Patent Specification No. 72/4156 of Nelson V. Seeger and Andrew J. Kaman, the disclosure of which is incorporated herein by reference. Difficulty has been met in the development of an appearance of opacity that spoils the optical properties of transparent windows when various well known primers for polyurethane are used to adhere these polyester type polyurethanes to acrylic plastic sheets or other sheets of polyurethane prior to the present invention.

2. Description of the Prior Art

U.S. Pat. No. 3,657,057 to Norman Shorr and Harry E. Littell, Jr. uses an A-stage liquid polyurethane alone or mixed with organic solvents as a primer for adhering a cured sheet of polyurethane to a rigid transparent sheet such as glass or polycarbonate. When the assembly containing the A-stage liquid polyurethane is subjected to heat and pressure, the A-stage polyurethane polymerizes into the C-stage to produce an improved adhesive bond between the cured polyurethane sheet and glass or polycarbonate. While an A-stage polyurethane primer or a primer solution containing an A-stage polyurethane dissolved in a suitable solvent provides excellent adhesion when the primer is applied shortly after its manufacture, unfortunately such primers have a relatively short shelf life and can only be stored for a very limited period before the polyurethane polymerizes into the less soluble B and C stages or into a solid stage in which adhesion is difficult to attain.

U.S. Pat. No. 3,804,810 to Michael Fryd uses organic solvents, such as chloroform and methylene chloride, in the reaction between a copolyester and a diisocyanate on the one hand and a polyester urethane cross-linker in the formation of a polyester urethane composition.

U.S. Pat. No. 3,428,609 to Kenneth William Chilvers and Gordon Trappe refers to the problem of dissolving solutions containing 10 percent to 80 percent of polyurethane. Both this patent and U.S. Pat. No. 3,503,934 to said Kenneth William Chilvers disclose processes which involves a chemical reaction step for dissolving polyurethane in an inert solvent.

Prior to the present invention, the best results in adhering polyurethane preformed sheets to acrylic sheets were obtained using a primer solution consisting essentially of a copolymer of alkyl methacrylate, alkyl acrylate and an unsaturated acid dissolved in a mixture of ethanol and ethylene dichloride. The present invention has resulted in adhesion values ranging from 5 to 7 times the adhesion value obtained from said prior art composition.

SUMMARY OF THE INVENTION

The present invention provides transparent laminates having a minimum of opacity problems by using a method of adhering a polymerized performed sheet of polyurethane that is normally difficult to maintain good optical properties while attempting to adhere to acrylic plastic or another sheet of polyurethane by applying a liquid primer composition containing up to 5 percent by weight of finely divided particles of a polymerized polyurethane dissolved in a volatile, liquid, organic solvent in which said polyurethane is soluble to a greater degree than 5 percent by weight, to a surface of at least one of the sheets destined to be an interfacial surface between said sheets. The primer composition is applied in an amount sufficient to form a continuous film on the applied surface. The sheets are then assembled with the applied surface in face to face relation to a surface of the other sheet. The assembly so formed (which optionally may also include additional sheets to be laminated) is subjected to heat and pressure for sufficient time to laminate the sheets and form a transparent laminate at a temperature below which one or both of the sheets would be damaged by such treatment. The volatile solvent is preferably chloroform.

The polymerized polyurethane ingredient of the primer composition is pulverized into tiny particles that dissolve readily in the solvent used. The primer composition is usually dilute and contains up to about 5 percent by weight of polyurethane dissolved in the solvent, preferably 1 percent to 4 percent by weight, and most preferably approximately 2 percent by weight based on the solvent when the solvent is chloroform.

The polyurethane component is preferably the reaction product of (a) a polyester having the ester linkage

and a pair of groups reactive with isocyanate or isothiocyanate groups; (b) a diisocyanate, a diisothiocyanate or a compound having an isocyanate and an isothiocyanate group; and (c) a compound containing at least two active hydrogens per molecule reactive with isocyanate or isothiocyanate groups. A preferred embodiment of the polyurethane ingredient is a polyesterurethane that is the reaction product of (a) polybutylene adipate, most preferably poly (1,4-butylene adipate); (b) 4,4'-methylene-bis (cyclohexyl isocyanate) sold under the trademark Hylene W; and (c) 1,4 butane diol. The total number of mols of (a) plus (c) is approximately equal to the total mols of (b). The urethane content of the reaction product should be a minimum of about 10 percent by weight and a maximum of about 20 percent by weight, preferably less than 16 percent by weight for a polyesterurethane that is the reaction product of a poly (1,4-butylene adipate) having an average molecular weight of 2000 with 1,4 butanediol and Hylene W. Under these circumstances, the molar ratio of poly (1,4-butylene adipate) to 1,4 butane diol ranges from 1/1.1 to 1/7 with the mol content of Hylene W equaling the total mol content of the poly (1,4-butylene adipate) and 1,4 butane diol.

BRIEF DESCRIPTION OF THE DRAWING

The FIGURE illustrates an assembly of a sheet of stretched acrylic, and a preformed sheet of polyurethane with a primer composition applied to one or both interfacial surfaces therebetween and showing how one or more additional layers may be applied to the surface of the polyurethane sheet opposite the surface facing the primer composition.

DESCRIPTION OF THE PREFERRED EMBODIMENTS

The drawing shows an assembly of a sheet of stretched acrylic, a sheet of polyurethane and a primer composition previously applied to one or both interfacial surfaces between the stretched acrylic sheet and the polyurethane sheet. It is understood, however, that a sheet of as cast acrylic or another sheet of polyurethane or a polycarbonate sheet or a sheet of some other polyester that serves as a glass substitute in laminated aircraft windows may be substituted for the stretched acrylic. Furthermore, the assembly to be laminated may optionally contain one or more layers of material on the side of the polyurethane sheet opposite the surface facing the primer composition.

The primer composition is made by pulverizing a sheet of polyurethane into finely divided particles. The particles are added to the solvent used in concentrations up to 5 percent by weight, preferably 1 percent to 4 percent and most preferably approximately 2 percent. The ingredients of the primer composition, namely, the small particles of polyesterurethane and the solvent, are maintained in a capped glass container, which is mounted on a spinning device. The closed glass container is agitated until the particles are no longer visible, thus indicating that the particles have dissolved in the solvent.

The sheet to be primed is prepared for priming by protecting its surface to be remained unprimed by covering the latter surface with a mask such as TEDLAR polyvinyl fluoride film. The surface to be primed is cleaned, using a clean pad of polyurethane foam saturated with isopropanol. The pad is rubbed against the surface until the latter is clean. Then, the sheet is stored for 20 to 30 minutes in a clean room at low humidity until the isopropanol evaporates.

The surface to be primed is exposed to the spray from a Binks Model 18 spray gun set for 18 pounds per square inch (90 kilograms per square centimeter) pressure, its air regulator valve is opened ⅜ turn from the closed position, its fluid regulator valve is opened 1¼ turns from the closed position and the primer composition is sprayed with the spray gun nozzle moving relative to the surface to be primed at a distance of approximately 3 to 4 inches (approximately 75 to 100 millimeters) from the surface to be primed. The primer composition is applied at 12 cubic centimeters per square foot (130 cubic centimeters per square meter) of surface primed for a 2 percent primer solution, 6 cubic centimeters per square foot (65 cubic centimeters per square meter) for a 4 percent primer solution, and 24 cubic centimeters per square foot (260 cubic centimeters per square meter) for a 1 percent primer solution.

The primer composition is preferably applied in two coats, each with 100 percent coverage of the surface, with the passes for one coat applied along substantially parallel axes extending normal to the substantially parallel axes of the passes of the other coat. It is important that the primer spray be wet when it contacts the surface to be primed. The primer composition should be sprayed in a clean, well ventilated area.

The sheet on which the primer composition is sprayed is placed in a clean oven and maintained in the oven for 20 minutes at a temperature of approximately 160° F. (approximately 71° C.) to volatilize the solvent. The sheet is immediately stored in a low humidity atmosphere after its removal from the furnace. A relative humidity of 10 percent in a room at approximately 68° F. (20° C.) is suitable. The primed sheet may be stored for as long as 10 days before it is laminated.

The primed sheets of stretched acrylic resin or as cast acrylic or polyurethane remain stored until the operators are ready to assemble the primed sheet with its primed surface in face to face relation with a primed or unprimed surface of a polyurethane sheet to form a primed interface. Optionally, depending on the construction desired for the laminated window, one or more additional layers may be assembled in face to face relation with the opposite surface of the polyurethane sheet. Usually, these additional layers comprise alternate layers of relatively rigid material, such as glass or a plastic that is usually substituted for glass, such as acrylic resins, polycarbonates and polyesters; and of relatively flexible material, such as the interlayer materials like polyurethanes and plasticized polyvinyl butyral.

The layers or sheets which comprise the assembly components are assembled in an atmosphere of controlled humidity, preferably the room where the primed sheets are stored. The assembled components are taped together and the taped assembly wrapped in plastic (such as TEDLAR polyvinyl fluoride film) to maintain the assembly components in proper alignment. The resulting assembly wrapped in the film is inserted within a laminated bag of the type disclosed in U.S. Pat. No. 3,311,517 to Leroy D. Keslar and John Rankin.

The bag comprises an outer ply of polyethylene glycol terephthalate, commonly available under the trademark of Mylar, and an inner ply of polyethylene bonded to the Mylar. The inner surface of polyethylene is embossed to provide an embossed inner surface for the bag to ease removal of air when the bag is evacuated. The laminated wall of the bag has a total thickness not exceeding 5 mils (approximately 0.127 millimeter). The bag containing its contents is evacuated for 1 to 20 minutes and the opening along one side of the bag is sealed before evacuation is ended. As a precautionary measure, the sealed, evacuated bag with its taped assembly sealed therein, is inserted within another bag identical to the first bag and the second bag is evacuated and sealed in a manner similar to the treatment of the first bag.

The sealed bags containing their taped assemblies are immersed in an autoclave for final lamination under the conditions recited hereinafter for different assembly components to be laminated to polyurethane:

|  | POLYURETHANE OR AS CAST ACRYLIC | STRETCHED ACRYLIC |
| --- | --- | --- |
| Temperature | 160° F. to 300° F. (71°-149° C.) | 160° F. to 225° F. (71°-107° C.) |
| Time | 30 to 300 minutes | 30 to 300 minutes |
| Pressure | 200 psi (976 Kg/m²) | 200 psi (976 Kg/m²) |

In discussing the properties of the laminates described in the following examples, reference will be made to several test procedures employed to evaluate adhesion of a polyurethane sheet to a sheet of acrylic plastic (either stretched or as cast) or another sheet of polyurethane. Such tests are described in the following portion of this specification.

A test for measuring the adhesion of laminated components to one another is the 90° Peel Test. The 90° Peel Test measures the peel resistance of an adhesive bond between adjacent components by the method described in NASA TECH BRIEF NO. 65-10173 entitled "Peel Resistance of Adhesive Bonds Accurately Measured". The testing apparatus in this test procedure consists of a series of movable rollers or supports which allow the test specimen to be peeled at a constant 90° angle along its entire uncut length. The apparatus consists of a series of five 1.000±0.005 inch (25.4±0.01 mm) rollers which are geometrically affixed to two side supports and a base plate. The two lower rollers are adjustable so that the apparatus can easily accommodate test specimens varying in thickness from ⅛ to 1 inch (approximately 3 to 25 millimeters). A suitable top clamp is used for securing the plastic layer.

The test specimen should be at least 10 inches (254 millimeters) in length and 2 inches (approximately 50 millimeters) in width, and should be prepared so that at least 2 inches (50.8 millimeters) and not more than 3½ inches (88.9 millimeters) of the plastic layer is completely released from the glass layer at either end of the length. This may be accomplished prior to the testing by insuring that a portion of the test specimen remains unbonded.

At least 6 specimens, 2 or more from each of 3 bonded panels, should be tested for each adhesive sample.

In the actual testing procedure, the fixture is affixed to the movable head of the testing machine in a position which will cause the peeled plastic layer to form a 90° angle with the test specimen during the test. The test specimen should be positioned in the fixture and the free skin clamped securely. The clamp is then pinned to the top head of the testing machine. With no load on the test specimen, the weighting apparatus is then balanced to zero. Provision should be made to autograph the peel load versus displacement of the head for a peel distance of at least 6 inches (about 150 millimeters).

The maximum load obtained during any one specimen test should be at least 10 percent of the full scale value. A minimum of 6 inches (about 150 millimeters) of facing should be peeled from the honeycomb sandwich at a testing machine head speed of 4.00±0.01 inch (101.6±0.25 millimeter) per minute.

Neglecting the first inch (approximately 25 millimeters) of peel, the load required to peel the plastic layer shall be taken from the autographic curve. The peel strength is then calculated as follows:

$$p = \frac{\text{peeling load (pounds)}}{\text{width of specimen (inches)}}$$

which can be converted to metric units (Kilograms/centimeter).

The following experiments were performed comparing the effect of different primers on the adhesion of 2 readily available polyurethane compositions to stretched acrylic. The latter was polymethyl methacrylate.

The control primer (the best available prior to the present invention) was a proprietary composition consisting essentially of a copolymer of alkyl methacrylate, alkyl acrylate and unsaturated acid in an ethanol-ethylene dichloride mix containing 25 percent solids. The primer composition according to the present invention consisted essentially of 2 parts by weight of polyurethane strips about 30 mils (0.762 millimeter) thick, ⅛ inch (approximately 3 millimeters) wide and 1 to 2 inches (approximately 25 to 50 millimeters) long dissolved in 100 parts by weight of chloroform.

The following table compares the results of 90° Peel Tests performed as described earlier.

| Polyurethane | Primer | Bond Strength | |
| --- | --- | --- | --- |
| | | Pounds/inch | Kilograms/cm. |
| A | This invention | 30-34 | 6-7 |
| A | Control | 6-10 | 1-2 |
| B | This invention | 53-60 | 8-10 |
| B | Control | 8-16 | 1-3 |

Further peel tests with polyurethane B using the primer of this invention developed bond strengths of 92-108 pounds per inch (equivalent to about 16-20 Kilograms per centimeter) when the polyurethane sheets of composition B were press polished before assembling against a primed surface of methyl methacrylate sheeting.

The approximate proportions of the ingredients of the reaction products forming polyurethane A and polyurethane B used in the peel tests described previously were as follows:

| Ingredient | Polyurethane A | Polyurethane B |
| --- | --- | --- |
| Polybutylene adipate diol (average molecular weight 1990) | 1 mol | 1 mol |
| 1,4 butane diol | 2.736 mols | 2.133 mols |
| 4,4'-methylene-bis(cyclohexyl isocyanate) (HYLENE W) | 3.736 mols | 3.133 mols |

The polybutylene adipate diol used in the best embodiment of polyurethane compositions dissolved in the solvents to form primer compositions according to the teachings of the present invention most preferably has an average molecular weight of approximately 2000. However, superior results are obtained when the average molecular weight ranges between 1000 and 4000 and adequate results are obtained with average molecular weights of about 750 to about 5000. Suitable polyurethanes contain n mols of butane diol and n+1 mols of Hylene W for each mol of polyester, of which polybutylene adipate is an example, where n equals from about 1.1 to about 7.

The urethane content of a polyesterurethane formed as the reaction product of 1 mol of polybutylene adipate having an average molecular weight of 1990, 1.153 mols of butane diol and 2.153 mols of Hylene W is 10 percent. The urethane content should not be reduced below 10 percent in order to avoid having hard crystalline material which provides the polyurethane sheeting with an appearance of opacity. When the mol ratio is approximately 1 mol of polybutylene adipate to 7 mols of butane diol and 8 mols of Hylene W, the urethane content of the reaction product that results in polyurethane sheeting is 20 percent. A greater urethane content than 20 percent produces a hard amorphous polyurethane which also leads to opacity problems in the polyurethane primer. It is preferred that the urethane content of the polyurethane be limited to a maximum of 16 percent to provide the primer with optimum elasticity and avoid opacity problems. A polyurethane having 16 percent urethane content is the reaction product of 1 mol of polybutylene adipate having a molecular weight of approximately 2000, approximately 4 mols of butane diol and approximately 5 mols of Hylene W.

The polyurethane compositions A and B described in the report of the peel test results are in the most preferred range of polyurethane compositions to be used in the primer compositions dissolved in a suitable solvent. It is understood that variations in polyester composition and variations in the selection and processing of the ingredients that react to form the polyurethane sheeting that is cut into particles to be dissolved to form the primer according to the present invention may be made following the teachings of the aforesaid South African patent specification No. 72/4156 of Nelson V. Seeger and Andrew J. Kaman without departing from the gist of the present invention.

The solvent for the primer composition is preferably chloroform.

The term "particles" as used in this disclosure refers to strips and even sheets of polymerized polyurethane as well as finely pulverized particles. It is understood that larger particles take more time than smaller particles to dissolve in any given solvent at any given temperature. The solvents recited herein for the primer composition are capable of dissolving polyurethane in a reasonable time at room temperature. Chloroform dissolved the strips of polymerized polyurethane in preparation for the aforementioned peel tests in about 2 hours.

The form of the invention shown and described in this disclosure represents an illustrative embodiment and certain modifications thereof. It is understood that various changes may be made without departing from the gist of the invention as defined in the claimed subject matter which follows.

I claim:

1. A method of forming a transparent laminated window comprising a sheet of acrylic plastic bonded to a preformed sheet of polymerized polyurethane with a minimum of opacity problems resulting from applying a primer to bond said sheets together, said method comprising applying a liquid composition containing 1 to 4 parts by weight of particles of a polymerized polyester urethane dissolved in 100 parts of chloroform as a primer to a surface of said sheet of acrylic plastic destined to be an interfacial surface between said sheet of acrylic plastic and said sheet of polyurethane in a transparent laminated window comprising said sheets, in an amount sufficient to form a film of dissolved polymerized polyester urethane on said applied surface, volatilizing said chloroform from said applied surface, assembling said sheets with said applied acrylic surface in face to face relation to a surface of said polyurethane sheet, and subjecting said assembly so formed to a temperature of approximately 160° F. to 300° F. (approximately 70° C. to 149° C.) for 30 minutes to 300 minutes at an elevated pressure for sufficient time to laminate said sheets and form a transparent laminate free of opacity problems.

2. A method as in claim 1, wherein said liquid composition is applied in a concentration of approximately 2 parts by weight of said polymerized polyester urethane dissolved in 100 parts of chloroform.

3. A method as in claim 1 further including exposing said filmed sheet of acrylic plastic to a temperature in the range of approximately 100° to 160° F. (approximately 37° to 71° C.) for sufficient time to volatilize said solvent, storing said filmed sheet in a low relative humidity atmosphere having an absolute humidity not exceeding 20 percent relative humidity at room temperature (approximately 68° F. which approximates 20° C.) until said sheet is assembled for lamination.

4. A method as in claim 3, wherein said polyurethane particles consist essentially of the reaction product of (a) a polyester having the ester linkage of

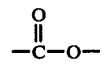

and a pair of groups reactive with isocyanate or isothiocyanate groups; (b) a diisocyanate, disisothiocyanate or a compound containing an isocyanate and an isothiocyanate group; and (c) a compound containing at least two active hydrogens per molecule reactive with isocyanate or isothiocyanate groups.

5. A method as in claim 4, wherein said polyurethane is the reaction product of poly(1,4-butylene adipate) diol polyester; 1,4 butane diol and 4,4-methylene-bis cyclohexyl isocynate.

6. A method as in claim 5, wherein said polyester has an average molecular weight between approximately 1000 and 4000 and said reaction product results from reacting n mols of butane diol and n+1 mols of said isocyanate with each mol of said polyester, where n equals 1.1 to 7.

* * * * *